(12) United States Patent
Snider et al.

(10) Patent No.: US 10,239,397 B2
(45) Date of Patent: Mar. 26, 2019

(54) SEALING SYSTEM FOR MOVABLE WINDOW OF REAR WINDOW ASSEMBLY

(71) Applicant: MAGNA MIRRORS OF AMERICA, INC., Holland, MI (US)

(72) Inventors: Darin J. Snider, Holland, MI (US); David K. Johnson, Holland, MI (US); Linh H. Pham, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 139 days.

(21) Appl. No.: 15/354,006

(22) Filed: Nov. 17, 2016

(65) Prior Publication Data

US 2017/0144524 A1     May 25, 2017

Related U.S. Application Data

(60) Provisional application No. 62/259,377, filed on Nov. 24, 2015.

(51) Int. Cl.
| | | |
|---|---|---|
| *E06B 1/00* | (2006.01) | |
| *B60J 10/74* | (2016.01) | |
| *E05D 15/06* | (2006.01) | |
| *B60J 1/18* | (2006.01) | |

(52) U.S. Cl.
CPC ............ *B60J 10/74* (2016.02); *B60J 1/1853* (2013.01); *E05D 15/0621* (2013.01); *E05Y 2800/12* (2013.01); *E05Y 2900/55* (2013.01)

(58) Field of Classification Search
CPC ................ B60J 1/1853; E05D 15/0621; E05Y 2900/55; E05Y 2800/12

USPC .................................................... 49/413, 380
See application file for complete search history.

(56) References Cited

U.S. PATENT DOCUMENTS

| | | |
|---|---|---|
| 957,728 A | 5/1910 | Bliss |
| 1,204,702 A | 11/1916 | Schupp |
| 2,762,675 A | 9/1956 | Janows |
| 2,858,408 A | 10/1958 | Barroero |
| 2,912,714 A | 11/1959 | Rich |
| 2,962,773 A | 12/1960 | Heller |
| 3,177,989 A | 4/1965 | Di Chiaro |
| 3,237,250 A | 3/1966 | Scoville |
| 3,379,859 A | 4/1968 | Marriott |
| 3,508,361 A | 4/1970 | Ryder |
| 3,715,707 A | 2/1973 | Anderson |
| 3,893,260 A | 7/1975 | Cadiou |
| 3,898,427 A | 8/1975 | Levin et al. |

(Continued)

*Primary Examiner* — Jerry E Redman
(74) *Attorney, Agent, or Firm* — Honigman LLP (57) ABSTRACT

A slider window assembly for a vehicle includes at least one fixed window panel and a movable window panel. A perimeter seal is disposed at a surface of the fixed window panel and includes a continuous sealing element that circumscribes an opening of the fixed window panel and that is configured to substantially seal against a surface of the movable window panel about a periphery of the movable window panel when the movable window panel is closed. The perimeter seal includes a sealing tab at a corner region of the perimeter seal where an upper sealing portion engages a first elongated side sealing portion. The sealing tab is joined with an elongated sealing lip of the upper sealing portion or the first elongated side sealing portion. The sealing tab extends from the elongated sealing lip toward the surface of the at least one fixed window panel.

10 Claims, 7 Drawing Sheets

(56) References Cited

U.S. PATENT DOCUMENTS

| | | | |
|---|---|---|---|
| 3,911,245 A | 10/1975 | O'Shaughnessy | |
| 3,964,068 A | 6/1976 | Torii et al. | |
| 3,995,142 A | 11/1976 | Ciardelli et al. | |
| 4,023,008 A | 5/1977 | Durussel | |
| 4,065,848 A | 1/1978 | Dery | |
| 4,081,926 A | 4/1978 | Jardin | |
| 4,124,054 A | 11/1978 | Spretnjak | |
| 4,137,447 A | 1/1979 | Boaz | |
| 4,158,270 A | 6/1979 | Cherbourg et al. | |
| 4,171,594 A | 10/1979 | Colanzi | |
| 4,244,774 A | 1/1981 | Dery | |
| RE30,663 E | 6/1981 | Schnitzius | |
| 4,388,522 A | 6/1983 | Boaz | |
| 4,410,843 A | 10/1983 | Sauer et al. | |
| 4,415,196 A | 11/1983 | Baum et al. | |
| 4,450,346 A | 5/1984 | Boaz | |
| 4,458,445 A | 7/1984 | Sauer et al. | |
| 4,519,443 A | 5/1985 | Sutoh et al. | |
| 4,552,611 A | 11/1985 | Dery et al. | |
| 4,606,159 A | 8/1986 | Kunert | |
| 4,611,849 A | 9/1986 | Trenker | |
| 4,635,398 A | 1/1987 | Nakamura | |
| 4,674,231 A | 6/1987 | Radek et al. | |
| 4,738,052 A | 4/1988 | Yoshida | |
| 4,723,809 A | 9/1988 | Kida et al. | |
| 4,785,583 A | 11/1988 | Kawagoe et al. | |
| 4,883,940 A | 11/1989 | Tokarz | |
| 4,894,954 A | 1/1990 | Nozaki | |
| 4,920,698 A | 5/1990 | Friese et al. | |
| 4,934,098 A | 6/1990 | Prouteau et al. | |
| 4,970,911 A | 11/1990 | Ujihara et al. | |
| 4,995,195 A | 2/1991 | Olberding et al. | |
| 5,046,283 A | 9/1991 | Compeau et al. | |
| 5,146,712 A | 9/1992 | Hlavaty | |
| 5,228,740 A | 7/1993 | Saltzman | |
| 5,245,788 A | 9/1993 | Riegelman | |
| 5,294,168 A | 3/1994 | Kronbetter | |
| 5,308,247 A | 5/1994 | Dyrdek | |
| 5,333,411 A | 8/1994 | Tschirschwitz et al. | |
| 5,345,717 A | 9/1994 | Mori et al. | |
| 5,363,596 A | 11/1994 | Kronbetter | |
| 5,367,827 A | 11/1994 | Taijima et al. | |
| 5,442,880 A | 8/1995 | Gipson | |
| 5,466,911 A | 11/1995 | Spagnoli et al. | |
| 5,467,560 A | 11/1995 | Camp et al. | |
| 5,473,840 A | 12/1995 | Gillen et al. | |
| 5,505,023 A | 4/1996 | Gillen et al. | |
| 5,522,191 A | 6/1996 | Wenner et al. | |
| 5,525,401 A | 6/1996 | Hirmer | |
| 5,531,046 A | 7/1996 | Kollar et al. | |
| 5,542,214 A | 8/1996 | Buening | |
| 5,572,376 A | 11/1996 | Pace | |
| 5,613,323 A | 3/1997 | Buening | |
| 5,617,675 A | 4/1997 | Kobrehel | |
| 5,711,112 A | 1/1998 | Barten et al. | |
| 5,716,536 A | 2/1998 | Yokoto et al. | |
| 5,724,769 A | 3/1998 | Cripe et al. | |
| 5,724,771 A | 3/1998 | Gipson | |
| 5,784,833 A | 7/1998 | Sponable et al. | |
| 5,799,444 A | 9/1998 | Freimark et al. | |
| 5,799,449 A | 9/1998 | Lyons et al. | |
| 5,822,922 A | 10/1998 | Grumm et al. | |
| 5,836,110 A | 11/1998 | Buening | |
| 5,853,895 A | 12/1998 | Lewno | |
| 5,890,321 A | 4/1999 | Staser et al. | |
| 5,953,887 A | 9/1999 | Lucas et al. | |
| 5,996,284 A | 12/1999 | Freimark et al. | |
| 5,997,793 A | 12/1999 | Lahnala | |
| 6,014,840 A | 1/2000 | Ray et al. | |
| 6,026,611 A | 2/2000 | Ralston et al. | |
| 6,038,819 A | 3/2000 | Klein | |
| 6,086,138 A | 7/2000 | Xu et al. | |
| 6,112,462 A | 9/2000 | Kolar | |
| 6,119,401 A | 9/2000 | Lin et al. | |
| 6,119,402 A | 9/2000 | Wisner | |
| 6,125,585 A | 10/2000 | Koneval et al. | |
| 6,161,894 A | 12/2000 | Chapman | |
| 6,223,470 B1 | 5/2001 | Millard et al. | |
| 6,225,904 B1 | 5/2001 | Jaffe et al. | |
| 6,293,609 B1 | 9/2001 | Xu et al. | |
| 6,324,788 B1 | 12/2001 | Koneval et al. | |
| 6,328,243 B1 | 12/2001 | Yamamoto | |
| 6,393,766 B2 | 5/2002 | Nozaki | |
| 6,490,832 B1 | 12/2002 | Fischbach et al. | |
| 6,525,659 B2 | 2/2003 | Jaffe et al. | |
| 6,591,552 B1 | 7/2003 | Rasmussen | |
| 6,598,931 B2 | 7/2003 | Tamura | |
| 6,691,464 B2 | 2/2004 | Nestell et al. | |
| 6,742,819 B2 | 6/2004 | So et al. | |
| 6,766,617 B2 | 7/2004 | Purcell | |
| 6,783,171 B2 | 8/2004 | Teishi | |
| 6,955,009 B2 | 10/2005 | Rasmussen | |
| 7,003,916 B2 | 2/2006 | Nestell et al. | |
| 7,010,883 B2 | 3/2006 | Jaerpsten et al. | |
| 7,014,251 B1 | 3/2006 | Husk | |
| 7,051,478 B2 | 5/2006 | Bourque et al. | |
| 7,073,293 B2 | 7/2006 | Galer | |
| 7,155,863 B2 | 1/2007 | Daniel et al. | |
| 7,184,190 B2 | 2/2007 | McCabe et al. | |
| 7,186,118 B2 | 3/2007 | Hansen et al. | |
| 7,219,470 B2 | 5/2007 | Lahnala | |
| 7,255,451 B2 | 8/2007 | McCabe et al. | |
| 7,259,359 B2 | 8/2007 | Davey et al. | |
| 7,395,631 B2 | 7/2008 | Lahnala | |
| 7,400,435 B2 | 7/2008 | Byers et al. | |
| 7,437,852 B2 | 10/2008 | Dufour et al. | |
| 7,608,949 B2 | 10/2009 | Busch | |
| 7,626,749 B2 | 12/2009 | Baur et al. | |
| RE41,502 E | 8/2010 | Neaux et al. | |
| 7,871,272 B2 | 1/2011 | Firman et al. | |
| 7,900,863 B1 | 3/2011 | Cheng | |
| 7,934,342 B2 * | 5/2011 | Lahnala | B60J 1/1853 49/380 |
| 7,963,070 B2 | 6/2011 | Recker | |
| 8,042,664 B2 | 10/2011 | Rutkowski et al. | |
| 8,069,615 B2 | 12/2011 | Heiman et al. | |
| 8,127,498 B2 | 3/2012 | Lahnala | |
| 8,151,519 B2 | 4/2012 | Bello et al. | |
| 8,250,812 B2 | 8/2012 | Hebert et al. | |
| 8,272,168 B2 | 9/2012 | Lahnala | |
| 8,402,695 B2 | 3/2013 | Smith et al. | |
| 8,881,458 B2 | 11/2014 | Snider et al. | |
| 8,915,018 B2 | 12/2014 | Snider | |
| 9,475,364 B2 | 10/2016 | Tooker et al. | |
| 9,894,717 B2 * | 2/2018 | Ash, Jr. | H05B 3/84 |
| 10,023,026 B2 * | 7/2018 | Snider | B60J 1/1853 |
| 2003/0074842 A1 | 4/2003 | Eckhardt et al. | |
| 2003/0140562 A1 | 7/2003 | Staser et al. | |
| 2003/0188487 A1 | 10/2003 | Rasmussen | |
| 2003/0188490 A1 | 10/2003 | Kraus et al. | |
| 2003/0213179 A1 * | 11/2003 | Galer | B60J 1/1853 49/413 |
| 2004/0020131 A1 | 2/2004 | Galer et al. | |
| 2004/0065017 A1 | 4/2004 | Priest et al. | |
| 2004/0065018 A1 | 4/2004 | Reginier et al. | |
| 2005/0073172 A1 * | 4/2005 | Weinert | B60J 1/1853 296/146.16 |
| 2006/0032140 A1 | 2/2006 | Arimoto et al. | |
| 2006/0061008 A1 | 3/2006 | Karner et al. | |
| 2006/0107600 A1 * | 5/2006 | Nestell | E05D 15/0621 49/413 |
| 2006/0130405 A1 | 6/2006 | Hemond et al. | |
| 2006/0175762 A1 | 8/2006 | Barnett | |
| 2007/0157522 A1 * | 7/2007 | Hebert | B60J 1/1853 49/413 |
| 2007/0209283 A1 | 9/2007 | Ostrowski et al. | |
| 2007/0277443 A1 | 12/2007 | Dery et al. | |
| 2008/0122262 A1 | 5/2008 | Cicala | |
| 2008/0127563 A1 | 6/2008 | Tooker | |
| 2008/0155902 A1 | 7/2008 | Kaiser | |
| 2008/0202032 A1 | 8/2008 | Loidolt | |
| 2009/0019778 A1 | 1/2009 | Lahnala | |
| 2009/0322705 A1 | 12/2009 | Halsey, IV | |
| 2010/0107505 A1 | 5/2010 | Schreiner | |

(56) References Cited

U.S. PATENT DOCUMENTS

| | | |
|---|---|---|
| 2010/0122497 A1 | 5/2010 | Lahnala |
| 2010/0146859 A1 | 6/2010 | Gipson et al. |
| 2010/0154312 A1* | 6/2010 | Gipson ............... E05D 15/0621 |
| | | 49/360 |
| 2010/0182143 A1 | 7/2010 | Lynam |
| 2010/0240229 A1 | 9/2010 | Firman et al. |
| 2010/0263290 A1 | 10/2010 | Pawloski et al. |
| 2011/0030276 A1 | 2/2011 | Smith et al. |
| 2011/0233182 A1 | 9/2011 | Baranski |
| 2012/0091113 A1 | 4/2012 | Bennett et al. |
| 2012/0091114 A1 | 4/2012 | Ackerman et al. |
| 2012/0117880 A1 | 5/2012 | Lahnala et al. |
| 2012/0139289 A1 | 6/2012 | Lahnala |
| 2013/0174488 A1 | 7/2013 | Snider et al. |
| 2013/0255156 A1 | 10/2013 | Snider |
| 2013/0277352 A1 | 10/2013 | Degen et al. |
| 2013/0283693 A1 | 10/2013 | Huizen et al. |
| 2014/0047772 A1 | 2/2014 | Hulst |
| 2014/0091074 A1 | 4/2014 | Lisinksi et al. |
| 2015/0101254 A1* | 4/2015 | Tooker ................... B60J 1/1853 |
| | | 49/413 |
| 2016/0135250 A1* | 5/2016 | Snider ................... B60J 1/1853 |
| | | 219/203 |

* cited by examiner

SEALING SYSTEM FOR MOVABLE WINDOW OF REAR WINDOW ASSEMBLY

CROSS REFERENCE TO RELATED APPLICATION

The present application claims the filing benefits of U.S. provisional application Ser. No. 62/259,377 filed Nov. 24, 2015, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include two or more panels, such as one or two fixed window panels and a slidable window panel. The slidable window panel is supported by rails and may be moved along the rails to open and close the window. The slidable window panel may be manually moved or may be driven or moved by a cable drive system.

SUMMARY OF THE INVENTION

The present invention provides a rear slider window assembly that has a unitarily formed perimeter seal for sealing the movable window panel relative to the fixed window panels when the movable window panel is closed. The perimeter seal comprises elongated sealing portions with corner sealing tabs or lips molded or formed at the ends of respective elongated sealing portions.

According to an aspect of the present invention, a rear slider window assembly of a vehicle (such as a pickup truck or the like) includes a frame portion having an upper rail and a lower rail. First and second spaced apart fixed window panels (or a single fixed window panel with an aperture formed therethrough) are fixed relative to the frame portion and define or establish an opening therebetween. A movable window panel is movable along the upper and lower rails and is movable between a closed position, where the movable window panel is disposed at the opening, and an opened position, where the movable window panel is disposed at least partially along the first fixed window panel. A perimeter seal is disposed at the fixed window panel or panels and around or circumscribing the opening. The seal is configured to slidingly and sealingly engage the surface of the movable window panel as the movable window panel moves between its opened and closed position and to substantially seal against the surface of the movable window panel when the movable window panel is closed over the opening, with the seal engaging the surface of the movable window panel about the periphery of the movable window panel. The perimeter seal comprises a sealing tab or lip at a corner region of the perimeter seal where the upper sealing portion engages the first elongated side sealing portion. The sealing tab or lip is joined with elongated sealing lips of the upper sealing portion and the first elongated side sealing portion and extends from the elongated sealing lips toward the surface of the at least one fixed window panel.

Similarly, the perimeter seal comprises a sealing tab or lip at a corner region of the perimeter seal where the lower sealing portion engages the first elongated side sealing portion. The sealing tab or lip is joined with elongated sealing lips of the lower sealing portion and the first elongated side sealing portion and extends from the elongated sealing lips toward the surface of the at least one fixed window panel. The first elongated side sealing portion comprises a double lip configuration for sealing against the movable window panel when the movable window panel is at least partially closed, and the sealing tab or lip of the first elongated side sealing portion is inboard of the double lip configuration and towards the opening of the at least one fixed window panel.

The perimeter seal of the present invention thus provides a continuous seal about the opening of the window assembly and may be readily attached or adhered to the fixed window panel or panels during manufacture of the window assembly. The seal of the present invention comprises a sealing element or seal having flexible tabs at at least some of the corners and thus does not have gaps at the corners and provides for enhanced sealing at the movable window panel when the movable window panel is closed.

These and other objects, advantages, purposes and features of the present invention will become apparent upon review of the following specification in conjunction with the drawings.

DESCRIPTION OF THE PREFERRED EMBODIMENTS

Figure 1:
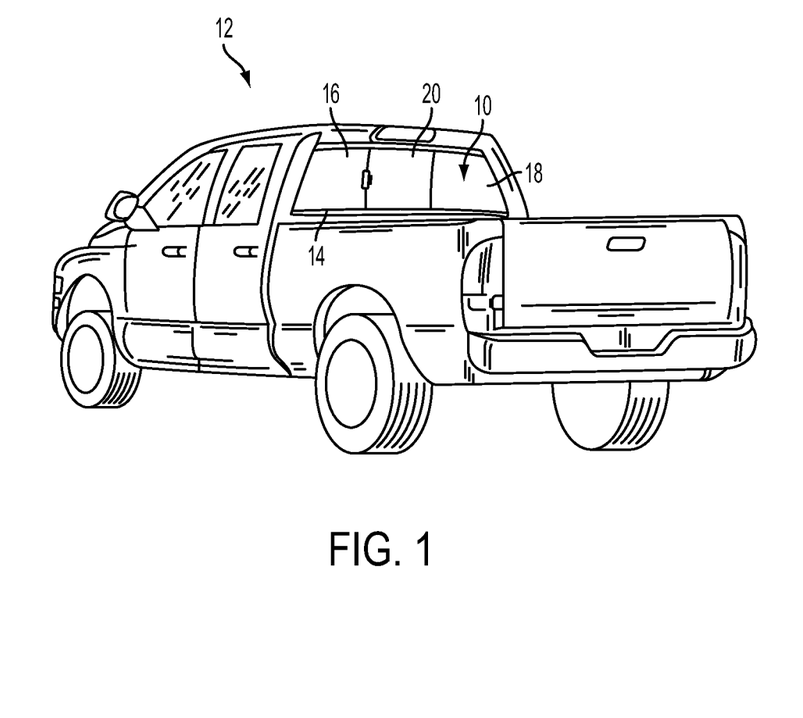
FIG. 1 is a rear perspective view of a pickup truck having a rear slider window assembly in accordance with the present invention.
Figure 2:
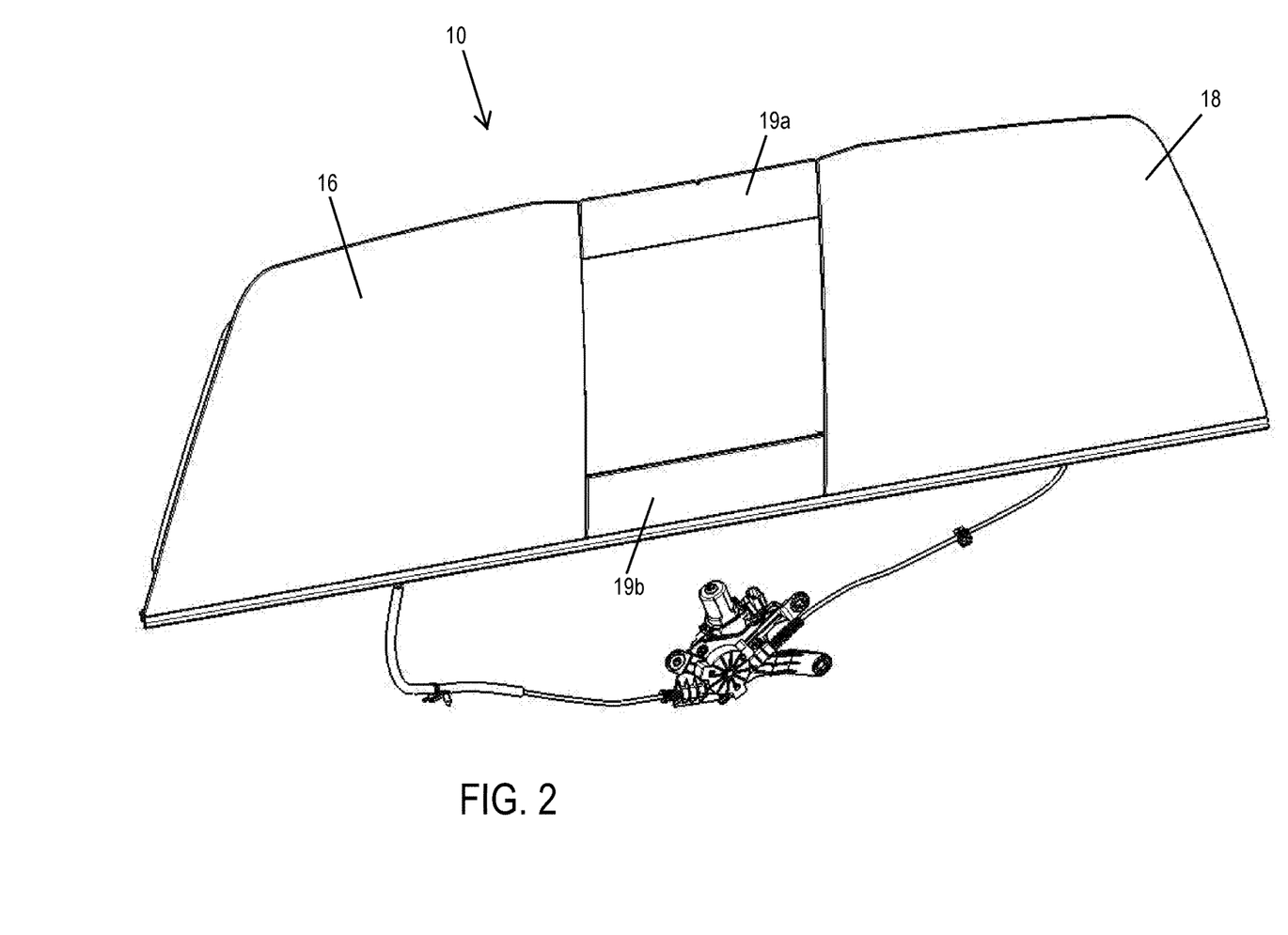
FIG. 2 is a perspective view of the rear slider window assembly having a window seal of the present invention.
Figure 3:
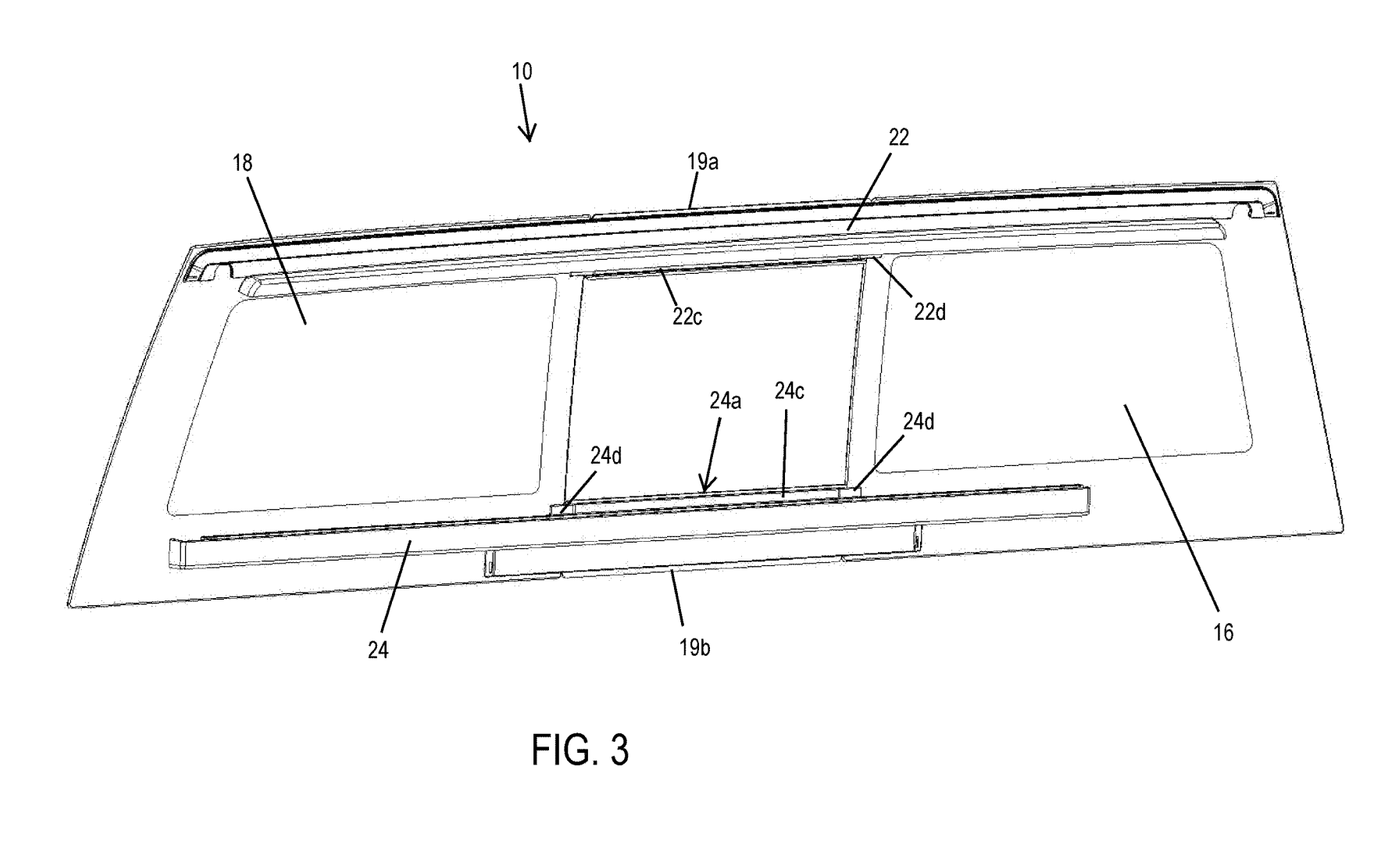
FIG. 3 is an inside plan view of the rear slider window assembly of FIG. 2.
Figure 4:
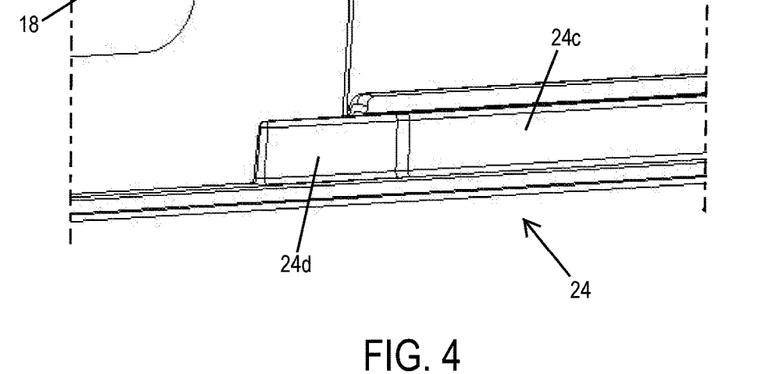
FIG. 4 is an enlarged perspective view of a lower region of the window assembly, showing a portion of the rail attached at the fixed window and lower appliqué.
Figures 5, 5A:
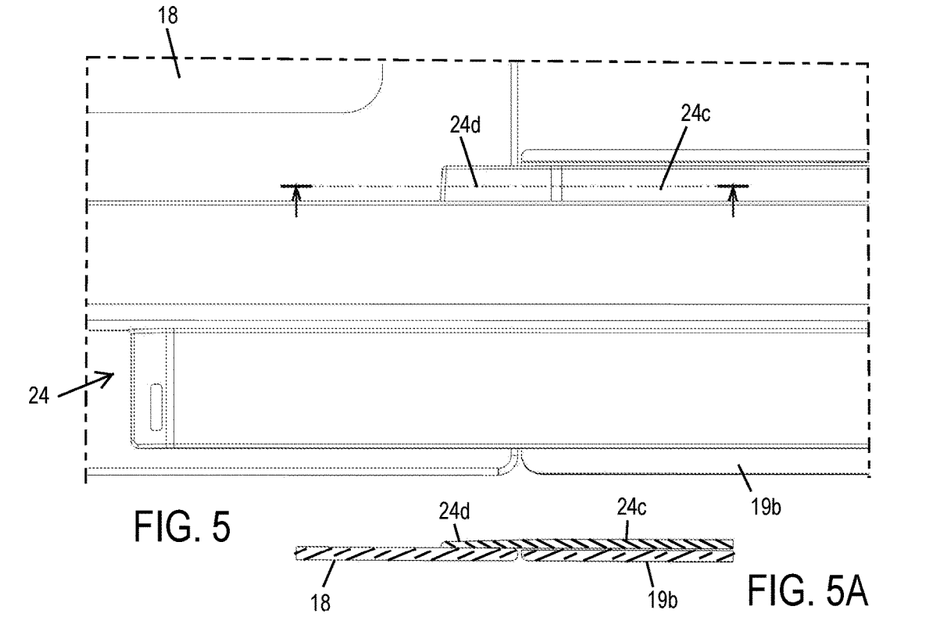
FIG. 5 is an inside plan view of the lower region of the window assembly of FIG. 4.
FIG. 5A is a sectional view of the lower window region taken along the line A-A in FIG. 5.

Referring now to the drawings and the illustrative embodiments depicted therein, a rear slider window assembly 10 of a vehicle 12 (such as a pickup truck or the like) includes a fixed window panel 16 (or a pair of side fixed window panels or fixed window panel portions) having an opening 18 established therethrough, and a movable window panel 20 that is movable relative to a frame or rails 22, 24 and fixed window panel 16 between an opened position and a closed position (FIGS. 1-3). The rails include an upper rail 22 and a lower rail 24, with the upper and lower edge regions of movable window panel 20 (FIG. 1) movably or slidably received in and along the respective upper and lower rails 22, 24. The window assembly 10 includes a perimeter seal 26 disposed at the fixed window panels and around window opening or aperture 18 established between the side panel portions of the fixed panel 16. When the movable window panel is closed, the perimeter seal 26 seals against a perimeter region of the surface of the movable window panel that faces the fixed window panel. The perimeter seal comprises a continuous seal having corner regions that include an integral sealing lip at the corner of at least the upper and lower ends of one of the vertical sealing portions (at the latch side of the movable window panel), as discussed below.

In the illustrated embodiment, the window assembly may comprise two fixed window panels or panel portions that are spaced apart so as to define an opening therebetween (and with upper and lower appliqués or trim or filler panels or elements 19a, 19b disposed at the upper and lower regions of the opening and between the fixed window panels). Optionally, the window assembly may comprise a hole-in-glass window configuration, where the single fixed glass panel has an aperture or hole or opening established therethrough to define separate spaced apart fixed window panels or panel portions. The window assembly may utilize aspects of the window assemblies described in U.S. Pat. Nos. 8,915,018 and/or 8,881,458, and/or U.S. Publication No. US-2003-0213179, and/or such as in RE41502, which are all hereby incorporated herein by reference in their entireties. The perimeter seal may utilize aspects of the sealing systems described in U.S. Pat. No. 9,475,364, which is hereby incorporated herein by reference in its entirety.

Upper and lower rails 22, 24 may comprise any suitable channel or rail element configured to slidably receive an upper or lower edge portion of the movable window panel. Slider or movable window panel 20 is movable along lower rail 24 and upper rail 22 of frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14. The rails and window assembly may utilize aspects of the rails and window assemblies described in U.S. patent application Ser. No. 15/352,799, filed Nov. 16, 2016, which is hereby incorporated herein by reference in its entirety.

Figure 6:
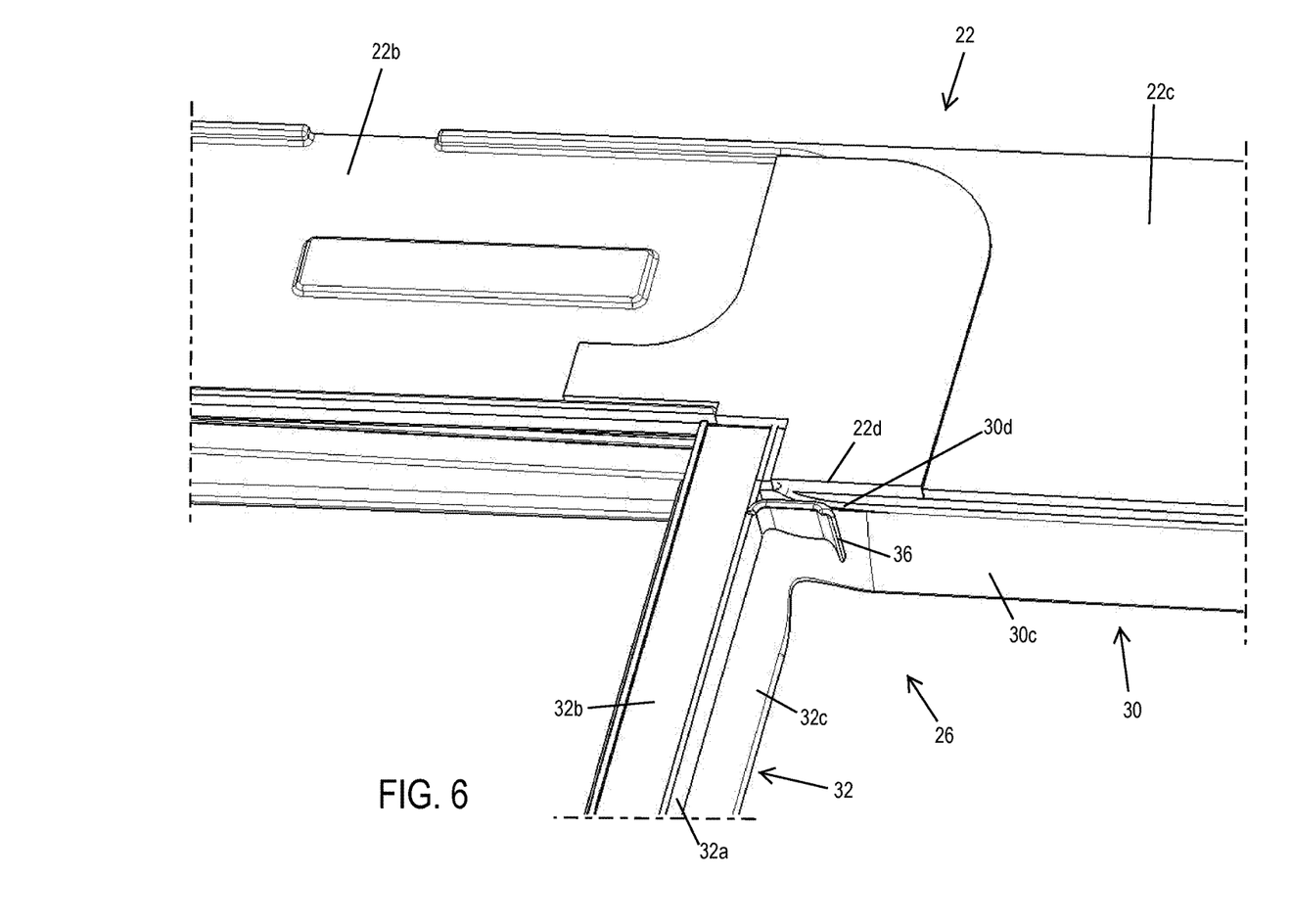
FIG. 6 is a perspective view of an upper corner the window seal of the present invention, shown with the glass panels removed.
Figure 7:
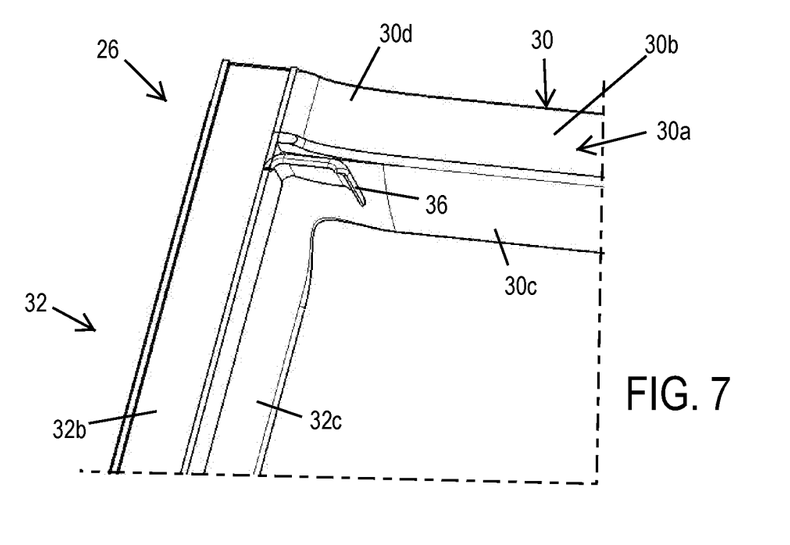
FIG. 7 is a perspective view of the upper corner region of the window seal of the present invention.

As shown in FIGS. 3-6, the upper and lower rails 22, 24 extend across the window assembly and are attached at the fixed window panels 16, 18 and the respective appliqués. As best shown in FIG. 6, the attaching portion 22a, 24a of the rails 22, 24 have narrower sections or portions 22b, 24b at the fixed window panels and have wider sections or portions 22c, 24c at the center regions or appliqués 19a, 19b. As also best shown in FIG. 6, the wider portions 22c, 24c have a ramped end 22d, 24d, such that the thickness of the attaching portions 22c, 24c taper or thin at their end so that the respective upper and lower sealing leg portions 30, 34 that are attached at the attaching portions 22c, 24c attach along the tapered end portion and join the upper sealing leg portion 32, which is configured to attach directly to the glass surface of the fixed window panel 16.

The perimeter seal 26 comprises a continuous seal having a first side leg or portion 28, an upper leg or portion 30, a second side leg or portion 32 and a lower leg or portion 34. Each of the sealing legs or portions 28, 30, 32, 34 has a respective elongated body portion or base portion (such as body portions 30a, 32a of sealing legs 30, 32) that has an attachment surface or element or portion (such as attachment portions 30b, 32b of sealing legs 30, 32) for attaching at the fixed window panel or panels and the rail attachment portions at the upper and lower appliqués and around the opening. For example, the attachment element may comprise an adhesive strip established along the body portion of the respective sealing leg for adhesively attaching the perimeter seal 26 to the fixed window panels around the opening (such as to portions of the fixed window panel that have a darkened or opaque or non-light-transmissive coating established thereat). The perimeter seal thus may be adhered or otherwise attached to the surface of the fixed window panel (with the adhesive strip attached at the back of the elongated body portion and having a removable film or cover that is removed to expose the adhesive for attaching at the window panel) around the opening so as to circumscribe the opening or aperture (or, for two fixed window panel configurations, the perimeter seal may be adhered or otherwise attached to the surfaces of the fixed window panels and to the upper and lower appliqués so as to circumscribe the opening).

Each of the legs or portions 28, 30, 32, 34 of perimeter seal 26 has a respective seal configuration comprising a respective sealing lip established along and formed or extruded with the base portion, as discussed in detail below. Also, each of the legs or seal portions 28, 30, 32, 34 has its end regions joined to adjacent end regions of adjacent ones of the other sealing legs or portions.

In the illustrated embodiment, the seal portions 28, 30, 32, 34 provide a desired sealing lip configuration for their particular application or position or orientation relative to the movable window panel. For example, seal portion 28 is at the side of the window opening at which the movable window panel will slide along as it is opened and closed, and thus may have a sealing lip configuration that seals against the window panel as it is moved in either direction, while seal portion 32 is at the side of the window opening at which the movable window panel will be moved to when it is closed, and thus may have a sealing lip configuration that is configured for engagement with the window panel during only small movement of the window panel, and the upper and lower seal portions 30, 34 are configured to seal against the surface of the window panel as the window panel moves in a longitudinal direction along the seal portions 30, 34.

The seal portion 28 may have a Y-shaped sealing lip configuration, while the seal portion 32 may have a double lip configuration having two flexible lips that flex or curve in the closing direction of the movable window panel so that the lips seal against the surface of the movable window panel as it is closed. The upper and lower seal portions 30, 34 comprise single lip seal configurations having a single flexible sealing lip that flexes towards the opening and slidably engages the upper perimeter region of the surface of the movable window panel as the panel moves between its opened and closed positions.

In the illustrated embodiment, and as best seen with reference to FIG. 6, the upper sealing leg 30 and vertical sealing leg 32 are joined at an upper corner region at the end of the tapered end 22d of the rail attachment portion 22c (at upper appliqué 19a). At the corner junction of the sealing legs 30 and 32 (and similarly at the lower corner junction of sealing legs 34 and 32), a sealing tab or lip 36 is established at the end regions of sealing legs 30, 32 so as to provide additional sealing at the corner region and at the glass surface of the fixed window panel 16. The sealing lip is attached at and extends from and partially along a lip 30c of the upper sealing leg 30 and extends towards the glass surface of the fixed glass window panel 16 when the seal 26 is attached at the window panels and appliqués. The sealing tab or lip 36 also extends from an inboard lip 32c of the sealing leg 32. The sealing tab or lip 36 engages the glass surface of the fixed window panel 16 when the seal 26 is attached at the fixed window panel 16 and the upper appliqué 19a. The sealing tab or lip 36 limits water intrusion at the curved attachment area 30d of the upper sealing leg 30 at the tapered end 22d of the upper rail attachment portion 22c.

Similarly, the lower sealing leg 34 and vertical sealing leg 32 are joined at a lower corner region at the end of the tapered end 24d of the rail attachment portion 24c (at lower appliqué 19b). At the corner junction of the sealing legs 34 and 32, a sealing lip is established at the end regions of sealing legs 34, 32 so as to provide additional sealing at the lower corner region and at the glass surface of the fixed window panel 16. The sealing lip is attached at and extends from and partially along a lip of the lower sealing leg 34 and extends towards the glass surface of the fixed glass window panel 16 when the seal 26 is attached at the window panels and appliqués. The sealing lip also extends from the inboard lip 32c of the sealing leg 32. The sealing tab or lip 36 engages the glass surface of the fixed window panel 16 when the seal 26 is attached at the fixed window panel 16 and the lower appliqué 19b. The sealing lip limits water intrusion at the attachment area of the lower sealing leg 34 at the tapered end 24d of the lower rail attachment portion 24c.

Figure 8:
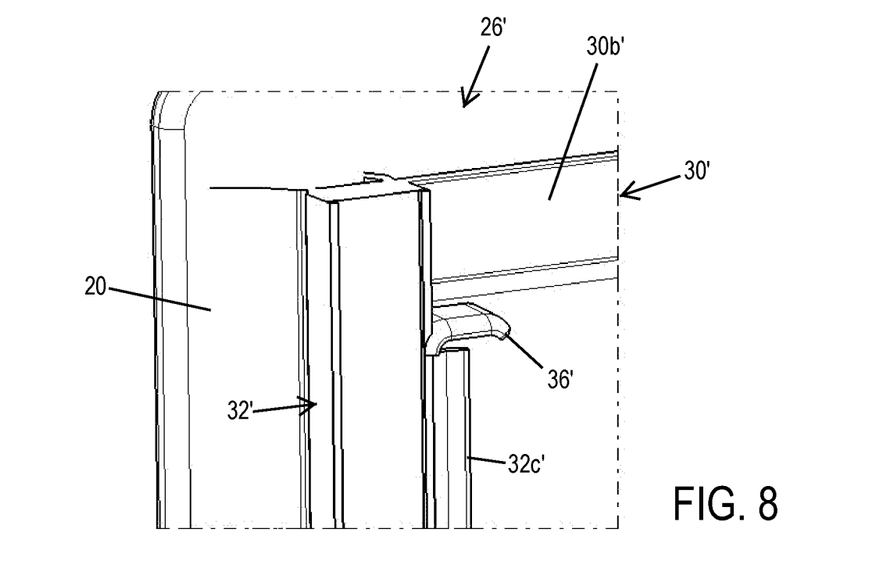
FIG. 8 is a perspective view of the upper corner region of another window seal of the present invention, shown sealing at the movable window panel.
Figures 9, 9A:
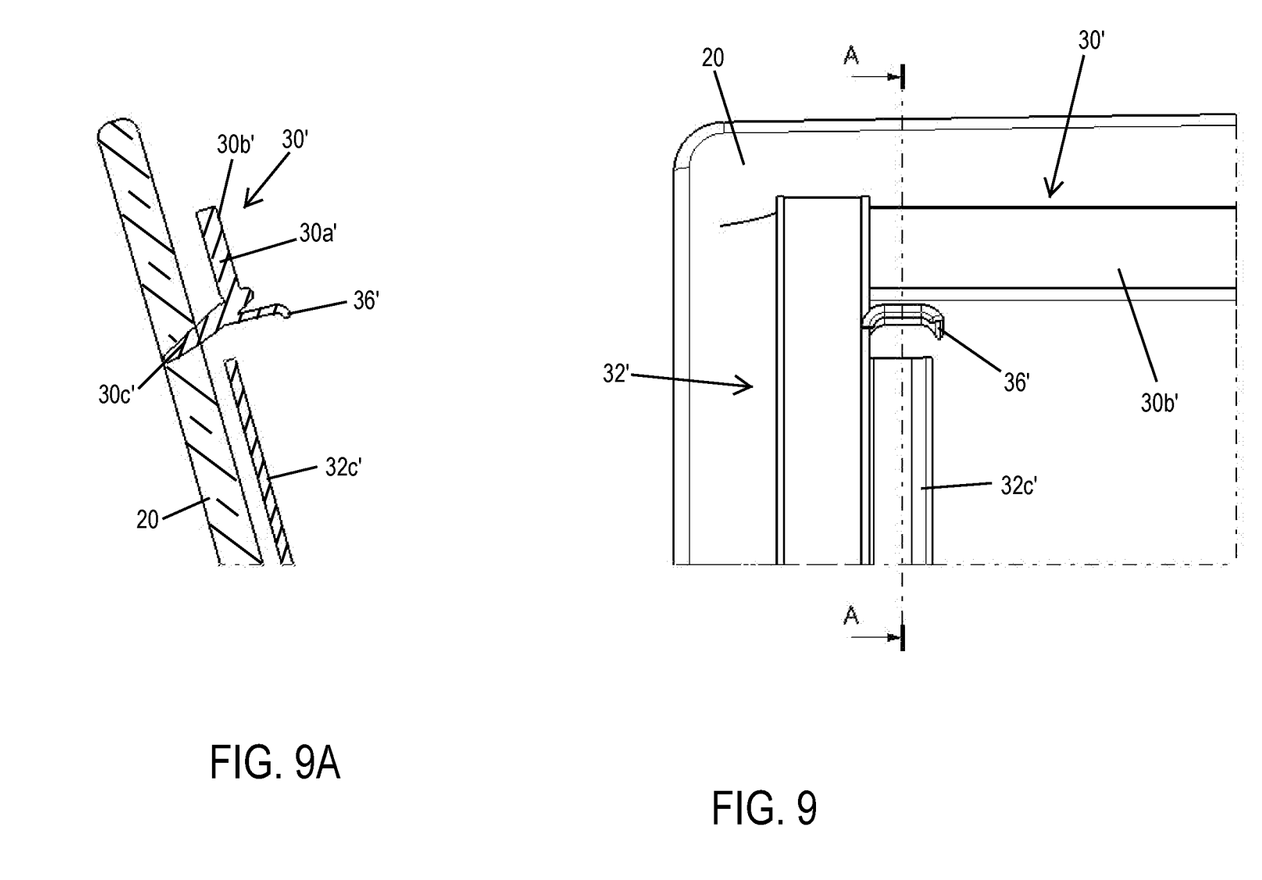
FIG. 9 is a perspective view of the upper corner region of the window seal of FIG. 8.
FIG. 9A is a sectional view of the window seal taken along the line A-A in FIG. 9.

Optionally, and such as shown in FIGS. 8, 9 and 9A, the perimeter seal 26' may have an upper sealing leg 30' that is configured for a rail attachment portion that is not ramped or tapered, such that the sealing body 30a' of sealing leg 30' does not include the ramped end at its attachment surface or portion 30b'. The additional sealing tab or lip 36' is formed as part of the sealing lip 30c' of sealing leg 30' (such as extruded with the sealing lip, or the tab may be molded at or attached at the sealing lip), and the sealing lip 32c' of sealing leg 32' is truncated so as to not extend to the sealing tab or lip 36' so that there may be a gap between the sealing tab or lip 36' and the sealing lip 32c'. The perimeter seal 26' may otherwise be substantially similar to the perimeter seal 26, discussed above, such that a detailed discussion of the perimeter seals need not be repeated herein.

Although shown and described as having the additional lip at the corner junctions of the double seal sealing leg 32 and the upper and lower sealing legs 30, 34, an additional sealing lip may also or otherwise be provided at the corner junctions of the Y-seal sealing leg 28 and the upper and lower sealing legs 30, 34, such as in a similar manner as described above.

Thus, the perimeter seal of the present invention may be formed to provide a continuous perimeter seal about an opening of a rear slider window assembly (or other type of window assembly). The sealing legs may comprise extruded sealing elements that are extruded or otherwise formed of a flexible rubber material (or any suitable sealing material). The corners or junctions of the sealing legs may be molded or joined together and an additional sealing lip may be provided or established at the corner region (such as by overmolding the additional sealing lip (such as via injection molding or the like) as part of the sealing lips at the end regions of the vertical leg 32 so as to limit water intrusion at the corner regions. When formed in this manner, the perimeter seal comprises a unitary perimeter seal that may be attached or adhered to the glass surface of the fixed window panel so that the perimeter seal provides a continuous sealing lip about its periphery and fully circumscribes the opening of the window with a continuous sealing lip. Thus, the present invention provides for enhanced sealing at the window seal with no gaps between sealing lips or elements arranged around the window opening.

The movable or slider window panel 20 is thus movable between its opened and closed positions and along the sealing elements, which maintain sealing engagement with the window panel as it moves along the rails 22, 24 of the window assembly. The movable window panel may be movable via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

The benefits of embodiments of the slider window assembly of the present invention may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,915,018 and/or 8,881,458, which are hereby incorporated herein by reference in their entireties.

Although shown and described as a horizontally movable center window that moves relative to a pair of opposite side windows (such as for applications at the rear of a cab of a pickup truck or the like), it is envisioned that the present invention is applicable to other types of movable window assemblies, such as horizontally movable window panels that move relative to a single fixed window panel and/or frames (such as for a rear or side opening of a vehicle or the like), and/or such as vertically movable window panels that move relative to one or more fixed panels and/or frames (such as for a rear or side opening of a vehicle or the like), while remaining within the spirit and scope of the present invention.

Optionally, the fixed window panel and movable window panel of the window assembly of the present invention may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. Nos. 8,402,695 and/or 8,881,458, incorporated above.

Optionally, the window assembly or assemblies of the present invention may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A slider window assembly for a vehicle, said slider window assembly comprising:
   at least one fixed window panel, said at least one fixed window panel defining an opening;
   an upper rail and a lower rail fixedly disposed at said at least one fixed window panel;
   a movable window panel that is movable along said upper rail and said lower rail, wherein said movable window panel is movable between a closed position, where said movable window panel is disposed at said opening, and an opened position, where said movable window panel is disposed at least partially along said at least one fixed window panel;
   a perimeter seal disposed at a surface of said at least one fixed window panel, wherein said perimeter seal comprises a continuous sealing element that circumscribes said opening and that is configured to seal against a surface of said movable window panel about a periphery of said movable window panel when said movable window panel is in the closed position;
   wherein said perimeter seal comprises an elongated upper sealing portion, an elongated lower sealing portion, a first elongated side sealing portion and a second elongated side sealing portion, and wherein said elongated sealing portions comprise respective elongated sealing lips; and
   wherein said perimeter seal comprises a sealing tab at a corner region of said perimeter seal where said upper sealing portion engages said first elongated side sealing portion, and wherein said sealing tab is joined with at least one of said elongated sealing lip of said upper sealing portion and said elongated sealing lip of said first elongated side sealing portion, and wherein said sealing tab extends from said at least one of said elongated sealing lips toward said surface of said at least one fixed window panel.

2. The slider window assembly of claim 1, wherein said elongated upper sealing portion, said elongated lower sealing portion, said first elongated side sealing portion and said second elongated side sealing portion comprise extruded sealing portions.

3. The slider window assembly of claim 1, wherein said sealing tab is overmolded at said at least one of said elongated sealing lip of said upper sealing portion and said elongated sealing lip of said first elongated side sealing portion when said upper sealing portion and said first elongated side sealing portion are joined.

4. The slider window assembly of claim 1, wherein said at least one fixed window panel comprises first and second fixed window panels defining an opening therebetween.

5. The slider window assembly of claim 4, wherein said perimeter seal is adhesively attached at respective surfaces of said first and second fixed window panels and at respective surfaces of upper and lower appliqués so as to be attached around said opening.

6. The slider window assembly of claim 4, wherein said upper rail comprises a rail attachment portion that attaches at said at least one fixed window panel and at an upper appliqué, and wherein said perimeter seal is adhesively attached at respective surfaces of said first and second fixed window panels and at said rail attachment portion at said upper appliqué.

7. The slider window assembly of claim 6, wherein said rail attachment portion comprises a fixed panel attachment portion and a wider appliqué attachment portion, and wherein said wider appliqué attachment portion has a tapered end at where it overlays a portion of said fixed window panel, and wherein said upper sealing portion is configured to attach along said tapered end of said wider appliqué attachment portion.

8. The slider window assembly of claim 1, wherein said at least one fixed window panel comprises a single fixed window panel having an opening therethrough, and wherein said perimeter seal is adhesively attached at a surface of said single fixed window panel around said opening.

9. The slider window assembly of claim 1, wherein said perimeter seal comprises another sealing tab at a corner region of said perimeter seal where said lower sealing portion engages said first elongated side sealing portion, and wherein said sealing tab is joined with at least one of an elongated sealing lip of said lower sealing portion and said elongated sealing lip of said first elongated side sealing portion, and wherein said sealing tab extends from said at least one of said elongated sealing lips toward said surface of said at least one fixed window panel.

10. The slider window assembly of claim 1, wherein said first elongated side sealing portion comprises a double lip configuration for sealing against said movable window panel when said movable window panel is at least partially closed, and wherein said sealing tab at said first elongated side sealing portion is inboard of said double lip configuration and towards the opening of said at least one fixed window panel.

* * * * *